G. MELLIS.
MULTIPLE SPINDLE MACHINE.
APPLICATION FILED FEB. 24, 1908.

921,721.

Patented May 18, 1909.
7 SHEETS—SHEET 1.

G. MELLIS.
MULTIPLE SPINDLE MACHINE.
APPLICATION FILED FEB. 24, 1908.

921,721.

Patented May 18, 1909.
7 SHEETS—SHEET 3.

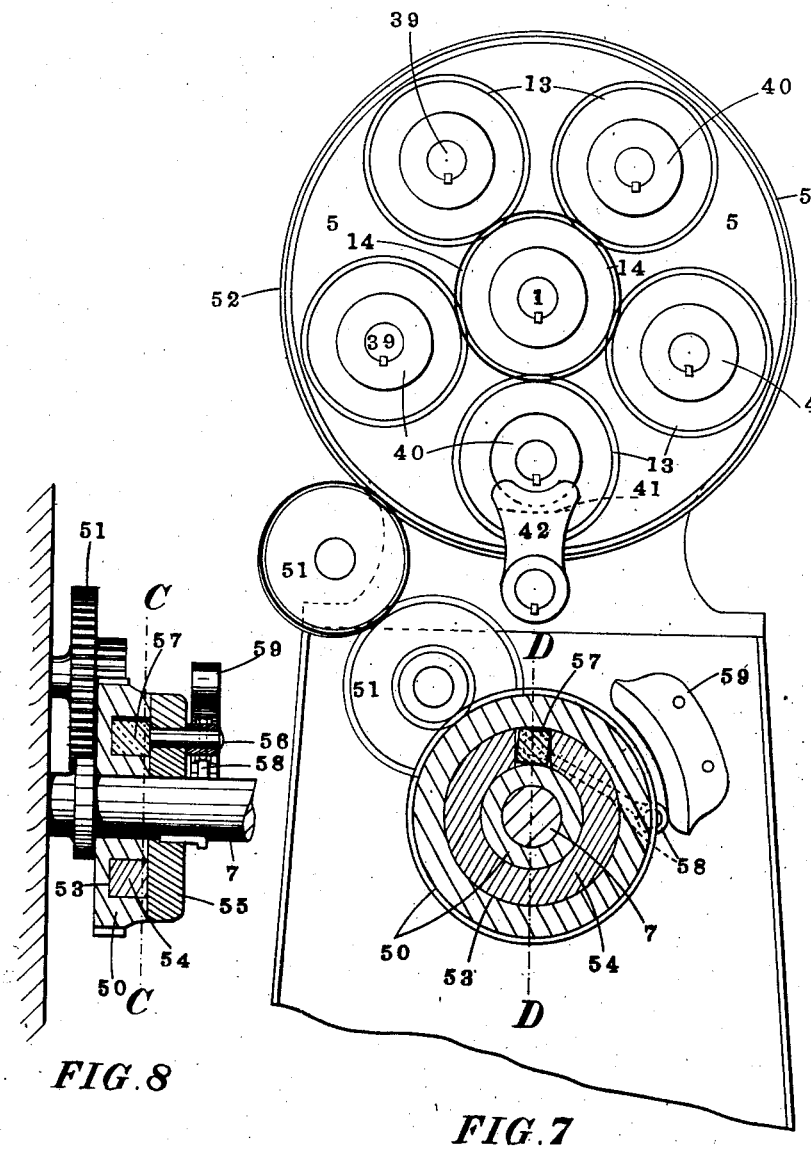

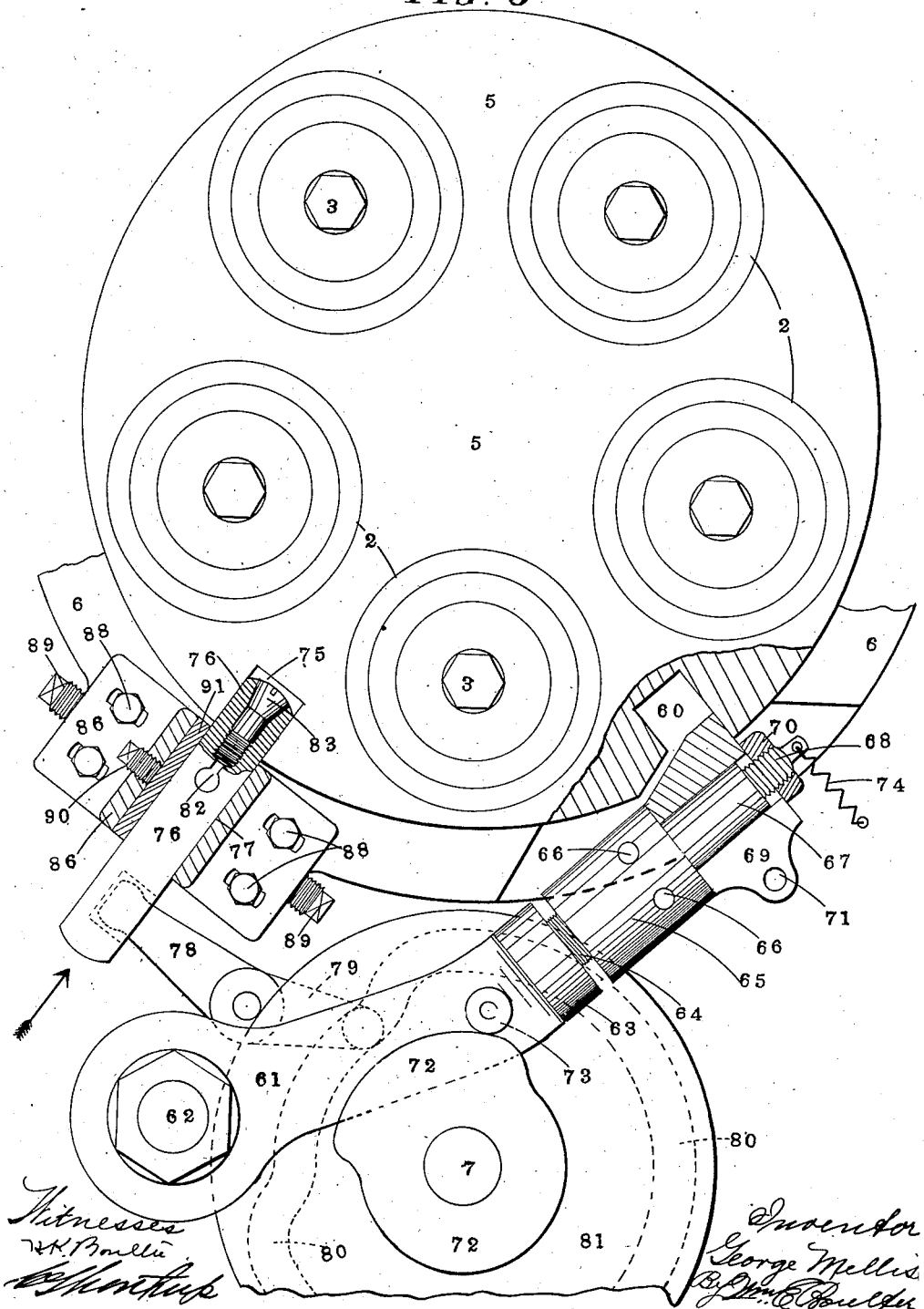

G. MELLIS.
MULTIPLE SPINDLE MACHINE.
APPLICATION FILED FEB. 24, 1908.
921,721.
Patented May 18, 1909.
7 SHEETS—SHEET 6.
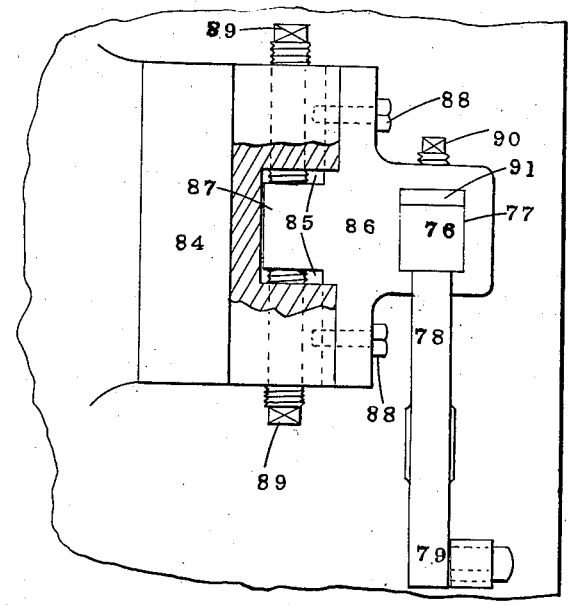
FIG. 10
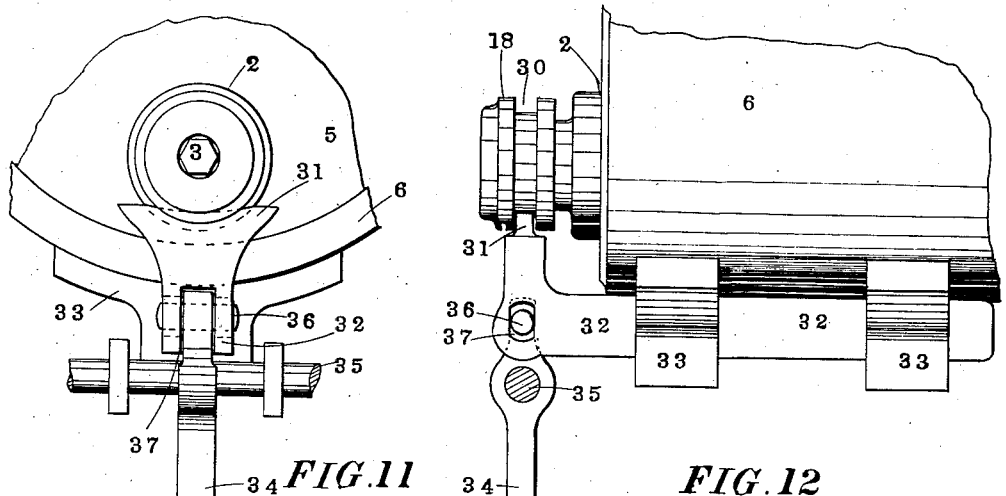
FIG. 11
FIG. 12
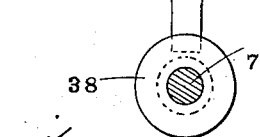
Witnesses:
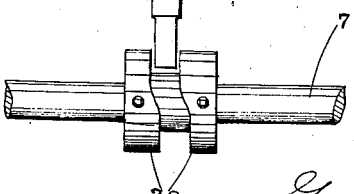
Inventor
George Mellis
By Wm E Boulter
attorney G. MELLIS.
MULTIPLE SPINDLE MACHINE.
APPLICATION FILED FEB. 24, 1908.
921,721.
Patented May 18, 1909.
7 SHEETS—SHEET 7.
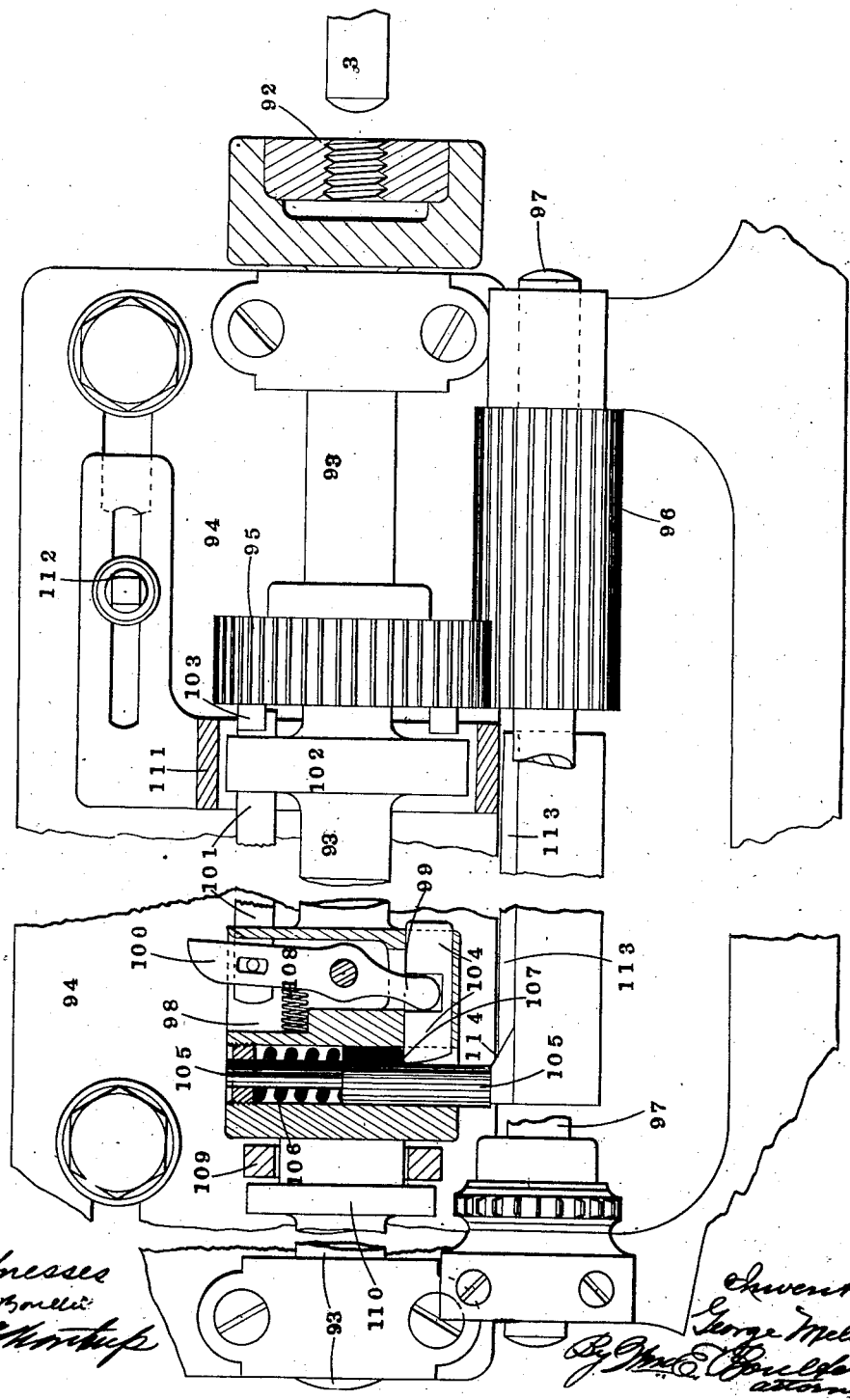

UNITED STATES PATENT OFFICE.

GEORGE MELLIS, OF LEEDS, ENGLAND.

MULTIPLE-SPINDLE MACHINE.

No. 921,721.   Specification of Letters Patent.   Patented May 18, 1909.

Application filed February 24, 1908. Serial No. 417,561.

*To all whom it may concern:*

Be it known that I, GEORGE MELLIS, a subject of the King of England, residing at Leeds, Yorkshire, in England, have invented certain new and useful Improvements in or Relating to Multiple-Spindle Machines, (for which I have made application for patent in Great Britain under No. 25,877, dated the 22d day of November, 1907,) of which the following is a specification.

This invention relates to multiple spindle machines or lathes for making screws, bolts, nuts and like articles its object being to provide improvements in the construction, operation and arrangement of some of the details thereof resulting in considerable economy in the production, an increased accuracy and finish of the articles, a larger output and in the machine being less costly to manufacture.

Figure 1:
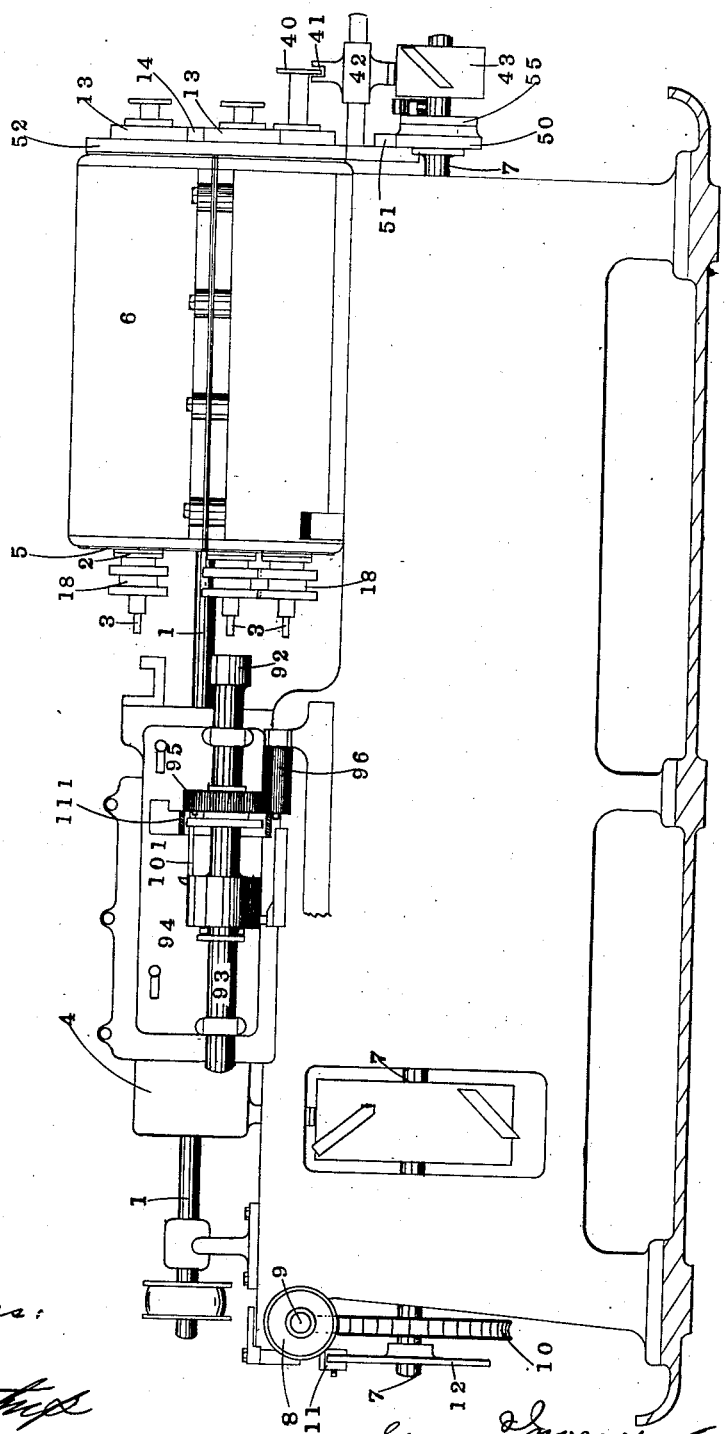
Figure 2:
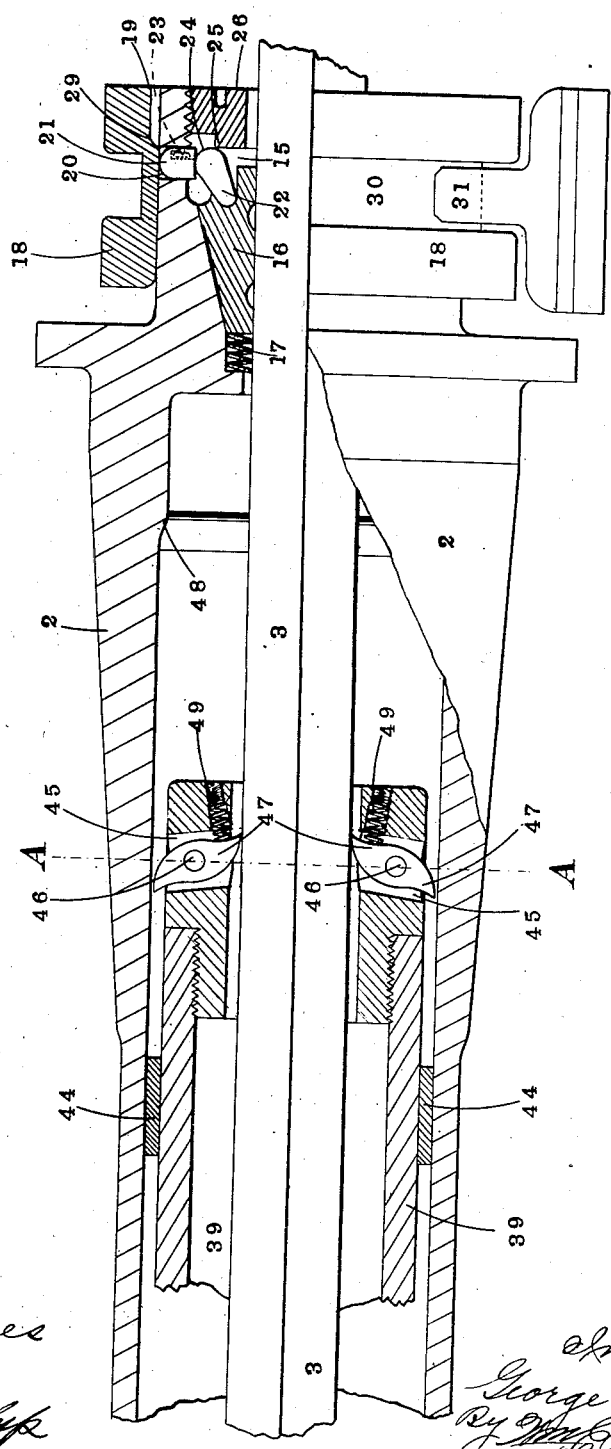
Figure 3:
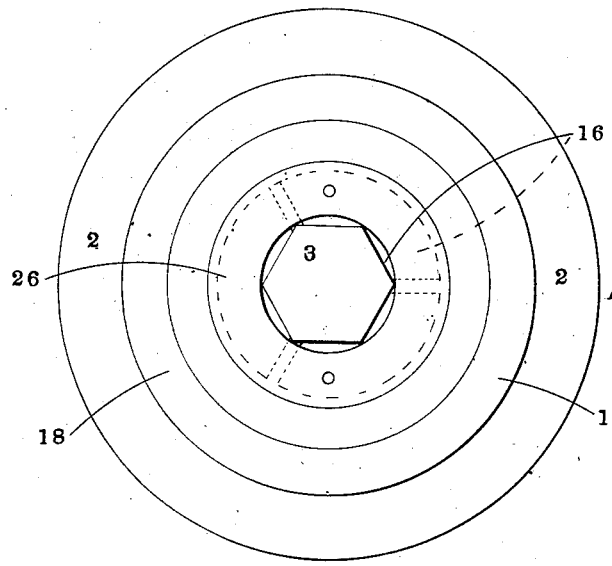
Figure 4:
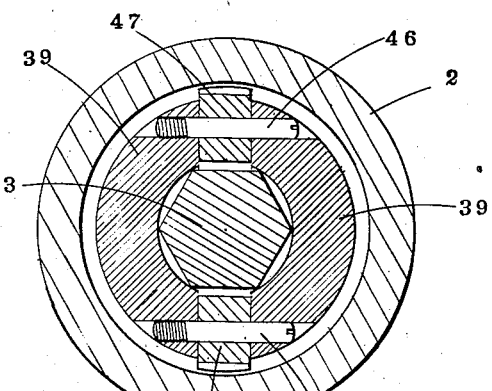
Figures 5, 6:
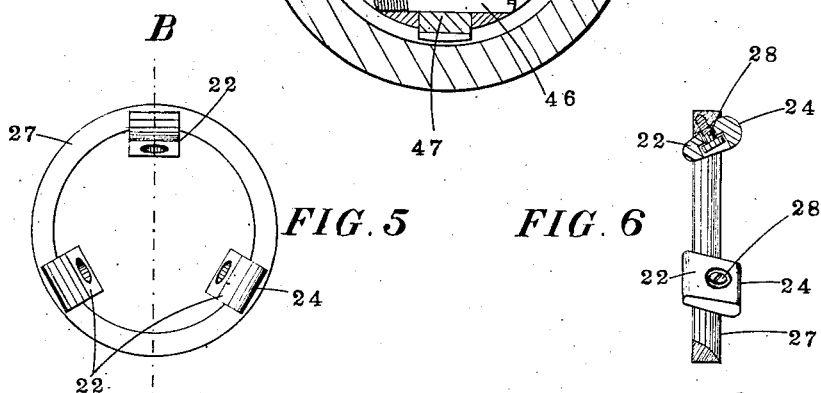

In the accompanying drawings:—Figure 1 is an elevation of a multiple spindle machine constructed according to this invention. Fig. 2 is a sectional elevation of one of the work carrying spindles detached from the turret head. Fig. 3 is an end view of Fig. 2. Fig. 4 is a section on the line A—A of Fig. 2. Fig. 5 is an elevation of a detail of the chuck shown in Fig. 2. Fig. 6 is a section on the line B—B of Fig. 5. Fig. 7 is an end view of the machine partly in section on the line C—C of Fig. 8. Fig. 8 is a sectional side view of part of Fig. 7, the section being taken on the line D—D of that figure. Fig. 9 is a front view, partly in section, of the turret head showing the mechanism employed to stop rotation of the turret and to lock it in position, parts of the machine being removed for the sake of clearness. Fig. 10 is a view, partly in section, of the locking mechanism shown in Fig. 9 looking in the direction of the arrow shown in that figure. Figs. 11 and 12 are respectively end and side views of the front end of the turret head showing the devices employed for operating the chuck in the work carrying spindle and Fig. 13 is a sectional elevation of the screw threading apparatus.

Like reference figures indicate like parts throughout the drawings.

The general design and construction of multiple spindle machines is well known and is not greatly modified according to the present invention, that is to say there is provided a central shaft 1 driving a number of work carrying spindles 2 each of which carries a separate work rod 3 to be operated upon by various tools supported by a reciprocating tool slide 4. There are five work carrying spindles 2 (although the number may be varied) and they are arranged around the central shaft 1 in a turret head 5 suitably mounted in a casing 6, the turret head 5 being intermittently rotated. A cam shaft 7, conveniently disposed below the central shaft 1, in or beneath the machine frame, is driven by means of a well known epicyclic gear 8 driving a worm shaft 9 gearing with a worm wheel 10 on the cam shaft 7 so arranged that at the desired periods the cam shaft may be driven at a slower or faster speed, such periods being controlled by dogs 11 movable on a disk 12 carried by the cam shaft 7 and operating a belt striker.

The following is a brief narrative of one complete cycle of operation performed by a machine constructed according to the present invention and designed to turn out screw threaded bolts:—The turret head 5 being locked the chuck holding the work rod 3 in one of the work carrying spindles 2 is released, the bar is fed forward to the full extent designed by a specially constructed device which then frees the bar and the latter is, if necessary, pushed back by the forward movement of the tool slide 4 the required distance for the particular article being made. The chuck is next tightened so that the rod 3 is firmly held and rotated with the revolving work carrying spindle 2, and the turret head 5 is partially rotated and again locked by special devices. While the work rod 3 is in this position the tool slide 4 is again moved forward and a preliminary cut made. The turret head is again revolved and locked and a second cut made after which the same operation is repeated for a third and finishing cut. The turret head 5 is moved still further and a screw thread formed upon the work by a suitable die which is rotated in the same direction as the work but at a greater speed so that the difference in speed forms the actual speed at which the die operates on the work. When the thread is formed for a sufficient length the rotation of the die is arrested so that the thread now formed on the rotating work will itself remove the die. The turret head is again partially rotated to the starting point where the finished work is cut off from the rod and the cycle repeated. Modifications may be made in this cycle without departing from the present invention such as taking only two plain cuts on the work and using two successive screw cutting dies although it is preferred to have only one screw cutting die. Similarly if the number of work carrying spindles are varied the different operations will be accordingly modified.

Each work carrying spindle 2 in the turret head is hollow and is driven by a gear wheel 13 (Fig. 7) attached to its rear end engaging with one 14 on the central shaft 1 which extends right through the turret head. Toward its other or free end there is a conical recess 15 (Fig. 2) in which is situated a special form of divided chuck preferably consisting of three jaws 16 whose outer sides are conical and whose inner faces are parallel to the work rod 3 when the outer faces are in contact with the sides of the conical recess 15. The chuck jaws 16 are capable of longitudinal movement and are acted upon by a spring 17 tending to move them so as to loosen their grip on the work rod. A separate spring may be provided for each jaw or one spring may operate them all. The chuck is closed by a sliding collar 18 situated on the work carrying spindle 2 outside the conical recess 15. The interior diameter of this collar is somewhat larger at its forward edge 19 than the remainder, forming an annular recess and when the collar is in its rearmost position this recess comes opposite a series of holes 20 extending from the conical recess 15 containing the chuck jaws and enables one or more fillets or the like 21 and 22 situated in each hole and having contact or connection with the chuck jaws 16 to protrude, being forced through by the spring 17 moving the chuck forward. The fillets 21 are preferably shaped as shown and may either be quite loose or pivoted together or connected by a short lever pivoted to each. A convenient method of keeping the fillets 21 in place within the holes 20 is to provide a slot in one face thereof engaging a projection or hook 23 screwed or otherwise secured to one face of the hole 20 as indicated in Fig. 2. The fillets 22 are also shaped as shown in Figs. 2, 5 and 6, being somewhat wedged shaped with rounded ends. These fillets 22 are so disposed that the thicker rounded end 24 bears both against the bottom of the fillet 21 and against a shoulder or the like 25 formed all around the inner side of an annular cover plate 26 screwed to the forward end of the work carrying spindle 2. The fillets 22 may also either be quite loose or attached to a carrying ring 27 by means of screws 28 passing through holes in the fillets 22 of the form shown in Fig. 6 and engaging with the ring 27. The method of attaching the fillets 21 and 22 is thus such as to facilitate the operation of assembling them in their proper places while a certain amount of movement is permitted to each fillet.

The arrangement of parts constituting the chuck and the means for operating it is thus such that when the collar 18 is moved forward the shoulder 29 between the recess and the remainder of its diameter forces the protruding parts of each fillet 21 inward and this movement is communicated by the fillets 22 to each of the chuck jaws 16 which are thereby moved against the action of the spring 17 to close contact with the work rod 3. Similarly movement of the collar 18 in the opposite direction enables the spring 17 to move the chuck jaws 16 forward, the fillets 21 protruding into the recess inside the collar 18.

An annular recess 30 is formed in the outside of each of the collars 18 above mentioned and an arm or projection 31 on a longitudinally movable plunger or rod 32 is capable of successively engaging with these recesses as the turret head 5 is rotated (Figs. 11 and 12). The plunger is carried in suitable bearings 33 on the turret casing 6 and a lever 34 pivoted at 35 to the frame has a projection or pin 36 engaging a slot 37 in the plunger 32. The lever is arranged at approximately right angles to the plunger and at the required distance from its pivot is operated upon by cam disks or the like 38 on the cam shaft 7 to move it backward and forward (pendulumlike) about its pivot 35. It will be appreciated that this movement of the lever reciprocates the plunger 32 and so moves the collar 18 operating the work rod chuck.

Inside each work carrying spindle 2 and embracing the work rod 3 therein there is an interior sleeve 39 (Fig. 2) projecting at the rear of the turret head 5. At this end of the sleeve there is situated a disk 40 (Figs. 1 and 7) capable of engagement, on the rotation of the turret head, with a suitably formed segmental recess 41 in a sliding member 42 which is mounted in any desired manner on the frame of the machine and is reciprocated by a cam 43 on the cam shaft 7. If desired the recess may consist of a circular groove in the sleeve and the projection be situated on the sliding member. Thus means are provided for longitudinally moving the sleeve 39 in each work carrying spindle 2.

Referring again to Fig. 2, at or near its forward end each sleeve 39 may be provided with a bearing 44 upon the spindle 2 and at this part each sleeve is provided with a number of circumferential holes 45. In each hole there is pivoted at 46 a special gripping piece 47 so shaped that when the sleeve is moved forward the inner ends of each gripping piece 47 obtain a frictional grip upon the work rod 3 and carry it forward with the sleeve 39. When moved backward, however, contact of the gripping pieces 47 with the work rod only tends to move them about their pivots 46 so that they can only move the bar forward and not backward. The exterior ends of the gripping pieces 47 extend somewhat beyond the sleeve 39 and at about the end of the forward movement of the latter come into contact with a projection or shoulder 48 on the interior of the work carrying spindle 2 which causes them to be sufficiently moved about their pivots to release their grip on the work rod which may then be moved backward by the tool slide 4 or by other means if it is not desired to make the article of the full length to which the rod has been advanced. The gripping pieces may be spring controlled if desired as shown at 49.

The partial rotation of the turret head 5 at the desired intervals is effected as follows:— A pinion 50 (Figs. 7 and 8) is loosely mounted on the cam shaft 7 at the rear of the machine and is connected by a suitable train of gearing 51 to a circular rack 52 attached outside the turret head 5. In the outer face of the loose pinion 50 there is formed an annular concentric recess 53 in which there is situated a divided spring ring 54, preferably flush with the outer face of the pinion. A disk or wheel 55 is keyed to the cam shaft 7 adjacent to the loose pinion and a bolt or pin 56 passes through a hole therein and has one end between the two ends of the spring ring 54. This bolt or pin 56 is so shaped as to that part which is between the ends of the spring ring as to form a cam member 57 having varied transverse dimensions and is round as to that part which fits the hole in the disk 55 keyed to the shaft. Beyond this wheel 55 the pin 56 has rigidly connected to it a projecting arm 58 adapted to come into contact with a fixed segmental cam piece 59 concentric with the cam shaft 7 secured to the frame of the machine in such a position that when the arm 58 comes into contact therewith the pin 56 is sufficiently rotated to expand the spring ring 54 and so lock the loose pinion 50 to the fixed wheel 55 on the cam shaft, the result being that while the arm 58 is in contact with the fixed segmental cam piece 59 the turret head 5 will be rotated. Hence the length of the segmental cam piece 59 governs the amount of rotation of the turret head. The turret head 5 is also provided with a number of recesses 60 (Fig. 9) in, or steps or brackets on, its outer face corresponding to the number of work carrying spindles. A lever 61 is pivoted at 62 to a convenient part of the machine frame and is arranged to be moved into one of the said recesses 60 to stop the rotation of the turret head as soon as the clutch ring 54 is loosened. The part of the lever 61 adjacent to its pivot 62 is flat being preferably rounded at its other end 63; projecting from this end of the lever is a screw thread portion 64 upon which is screwed a nut 65 which is conveniently made cylindrical with some convenient means for rotating it such as the holes 66 with which a suitable tool is intended to engage. The nut 65 is provided with a reduced part 67 which is again reduced and screw threaded at 68. A split sleeve 69 embraces the part 67 and is clamped thereto by the nut 70 the sleeve 69 being, if desired, additionally secured by a bolt passing through holes 71. The contact part of the recesses 60 and the split sleeve 69 are preferably made of hardened steel. The lever 61 is moved to bring the sleeve 69 into the recess 60 at the desired periods by means of a cam 72 on the cam shaft 7 acting upon a roller or the like 73 on the lever 61.

74 indicates a spring acting on the lever 61 adapted to insure the lever being removed from engagement with the recess 60 when the cam 72 reaches a position to allow of its withdrawal.

In order to insure the turret head being rigidly held in the exact position required a locking device is also provided for each phase. The locking devices comprise a slot or hole 75 in the casing 6 lined with hard steel for each work spindle and a single hardened steel bolt 76 carried in a suitable guideway 77 the bolt 76 being moved into each hole in succession by a two-armed lever 78— 79 one end 78 of which has engagement with a slot in the bolt 76 and the other end 79 of which is operated by a cam groove 80 in a disk 81 on the cam shaft 7. The end of the bolt 76 which engages the hole is also preferably made of hardened steel and in order that the bolt shall always exactly fit its hole to hold the turret head 5 quite rigid the bolt end is split as shown at 82 and is provided with a conical headed screw 83 situated in a hole in the split end and engaging corresponding screw threads in the bolt so that slight rotation of this screw in either direction will cause the diameter of the bolt to be accordingly varied. The mouth of the hole in which the screw 83 is situated may be flared as shown.

The head casing 6 is provided with a bracket 84 in which there is a recess 85. An adjustable support 86 for the bolt 76 is carried by this bracket, the support being provided with a projection 87 situated in the recess 85. The support is secured to the bracket 84 by bolts 88 passing through slots in the support and by set screws 89 bearing on the projection 87 in the recess 85 so that the position of the support 86 may be adjusted in relation to the machine frame. The guideway 77 carrying the bolt 76 is in the support 86 and a nice fit of the bolt therein in order to hold the turret head quite rigid may be insured by means of a set screw 90 bearing against a plate or the like 91 also in the guideway in contact with the bolt.

The construction and operation of the screw threading device is as follows:—The die 92 is held at one end of a longitudinally movable shaft 93 carried in suitable bearings on a longitudinally adjustable bracket 94 on the machine frame. A free gear wheel 95 is mounted on this shaft 93 and engages with a pinion 96 of sufficient length to allow for the longitudinal movement of the shaft. This pinion 96 is keyed to a separate shaft 97 which is independently rotated at such a speed that when the gear wheel 95 is clutched to the die shaft the latter will be rotated at the desired increase of speed compared with that of the work carrying spindles 2. A slot or recess 98 is formed in the die shaft, or in a boss thereon, transverse to its axis, and within this recess a short two armed lever 99—100 is pivoted, one end 100 of which projects beyond the periphery of the die shaft 93 or its boss. At or near this end of the lever a rod 101 is attached thereto at one end by a slot and pin connection. This rod is supported also in a guide formed through a boss or disk 102 on the die shaft adjacent to the free gear wheel 95, upon which are projections 103 adapted to contact with the end of the rod 101 and so lock the wheel 95 to the die shaft when the parts are in the position shown in Fig. 13. The other end 99 of the lever 99—100 in the recess 98 is connected to a longitudinally movable latch 104 in such a manner that movement of the lever about its pivot reciprocates the latch. This latch 104 is conveniently situated in a hole or channel longitudinal with the axis of the die shaft, formed in the edge of the boss containing the recess 98 and communicating with the said recess. Adjacent to this recess 98 there is formed a radial hole or the like containing a bolt 105 normally tending to be forced radially outward from the die shaft by a spring 106. This bolt is provided with a shoulder, projection or the like 107, with which one end of the latch 104 is capable of engaging in order to hold the former against the action of its spring. The lever 99—100 is spring controlled at 108 and in its normal position (shown in Fig. 13) the free gear wheel 95 is clutched to the die shaft 93 while the latch 104 is holding the spring controlled radial bolt 105 in its retracted position. The die shaft 93 is moved forward longitudinally by means of a forked lever 109 engaging a collar 110 thereon (or by any other desired means) operated in a suitable manner from the cam shaft 7. A circular abutment 111 is situated around the die shaft and is adjustable in position on the bracket 94 as indicated at 112. As the die shaft moves forward the projecting end 99 of the lever situated in the transverse slot therein comes into contact with this abutment 111 and is thereupon moved about its pivot against the action of its spring. This movement of the lever releases the clutch 101—103 and so takes off the power driving the die shaft. The same movement of the lever causes the latch 104 to be withdrawn from engagement with the spring bolt 105 and the latter is thereupon moved radially by means of its spring and in this extended position comes into contact with a longitudinal abutment 113 arranged adjacent to the die shaft, thus arresting the movement of the latter. The shape of this bolt is preferably such that when in its extended position it prevents the latch being returned by the spring 108 and so insures the gear wheel 95 remaining free on the shaft. Rotation of the die shaft being thus arrested it will be appreciated that the screw threads now formed on the rotating work rod 3 will cause the die shaft to be moved backward, automatically withdrawing the die from the work. In this backward movement of the die shaft the extended bolt comes into contact with an inclined plane or cam surface 114 and is thus forced back into its retracted position and the lever 99—100 is moved over by its spring 108 simultaneously locking the bolt and again clutching the gear wheel to the die shaft. If desired the last stage of the backward movement of the die shaft may be positively effected from the cam shaft in order to prevent the possibility of the momentum of the shaft being insufficient to force the spring controlled bolt back in its retracted position. It will be seen that the length of screw threads cut on the work may be varied by altering the position of the circular adjustable abutment 111 with which the projecting end of the lever comes into contact. The completed article is cut off by a tool or tools carried in slides on the frame and operated from the cam shaft.

What I claim and desire to secure by Letters Patent is:—

1. In a multiple spindle machine the combination of an intermittently-rotated turret head, a plurality of steps therein, a lever pivoted to the frame, an adjustable nose on the lever having a reduced end screw threaded at its extremity, a split sleeve on the reduced portion, lugs on said split sleeve, means engaging said lugs for clamping the sleeve in position and a nut on the screw threaded extremity for the purpose specified.

2. A locking bolt having a split end, a screw threaded hole in the split end, and a screw having conical head fitting said hole substantially as and for the purpose specified.

3. The combination of a bracket, a recess therein, an adjustable support having a projection situated in said recess, set screws in the bracket engaging on said projection, slots in said support, bolts passing through said slots engaging screw-threaded holes in the bracket, a guideway in the support and a reciprocating bolt in the said guideway substantially as specified.

4. The combination of a hollow work carrying spindle, a reciprocating feed sleeve therein, slots in the sleeve, cam shaped gripping pieces pivoted in said slots projecting inside the sleeve forward of their pivots in the direction of feed and also projecting outside the sleeve behind their pivots and a shoulder inside the spindle adapted to engage said outwardly projecting parts of the gripping pieces to release their grip on the work substantially as specified.

5. The combination of a longitudinally movable die shaft, means for rotating it, a clutch connecting said means to the die shaft, a lever pivoted to the die shaft, an abutment around the die shaft in the path of one end of said lever as the die shaft moves longitudinally and a disengageable operative connection between the lever and clutch for the purpose specified.

6. The combination of a longitudinally movable die shaft, means for rotating it, a clutch connecting said means to the die shaft, means for operating said clutch, a longitudinal abutment parallel to the die shaft, a spring controlled bolt mounted radially in the die shaft capable of engagement with said abutment, means for holding said bolt against the action of its spring clear of said abutment, means for releasing the bolt and means for moving it into its retracted position clear of the abutment for the purpose specified.

7. The combination of a longitudinally movable die shaft, means for rotating it, a clutch connecting said means to the die shaft, a lever pivoted to the die shaft, an abutment around the die shaft in the path of one end of said lever as the die shaft moves longitudinally, a disengageable operative connection between the lever and clutch, a longitudinal abutment parallel to the die shaft, a spring controlled bolt mounted radially in the die shaft capable of engagement with said abutment, a sliding latch, a disengageable operative connection between the bolt and latch enabling the latch to hold the bolt against the action of its spring clear of said abutment, an operative connection between the lever and the latch, a spring tending to make the connections of the lever with the clutch and of the latch with the bolt operative when disengaged by contact of the lever with the abutment around the die shaft and an inclined surface on the longitudinal abutment in the path of the re-released bolt for the purposes specified.

In testimony whereof I have signed my name to this specification in the presence of two subscribing witnesses.

GEORGE MELLIS.

Witnesses:
ARTHUR H. GREENWOOD,
LUTHER J. PARR.